(12) United States Patent
Cline et al.

(10) Patent No.: US 6,843,928 B2
(45) Date of Patent: Jan. 18, 2005

(54) METHOD FOR REMOVING METAL CLADDING FROM AIRFOIL SUBSTRATE

(75) Inventors: Larry Dean Cline, Fairfield, OH (US); Gerald Alexander Pauley, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 318 days.

(21) Appl. No.: 09/976,564

(22) Filed: Oct. 12, 2001

(65) Prior Publication Data

US 2003/0071019 A1 Apr. 17, 2003

(51) Int. Cl.[7] .............................. C03C 15/00; B44C 1/22
(52) U.S. Cl. ...................... 216/96; 216/100; 216/103; 216/109; 252/79.2
(58) Field of Search .................... 216/109, 96, 103, 216/100; 134/2, 3; 252/79.2

(56) References Cited

U.S. PATENT DOCUMENTS

| | | | |
|---|---|---|---|
| 4,006,999 A | 2/1977 | Brantley et al. | ............ 416/224 |
| 4,226,082 A | * 10/1980 | Nishida | ...................... 368/285 |
| 4,339,282 A | * 7/1982 | Lada et al. | ..................... 134/3 |
| 4,353,780 A | 10/1982 | Fishter et al. | ............... 156/664 |
| 4,411,730 A | 10/1983 | Fishter et al. | ............... 156/626 |
| RE31,605 E | * 6/1984 | Neal et al. | ............. 204/129.35 |
| 4,534,823 A | 8/1985 | Fishter et al. | ............... 156/626 |
| 4,563,239 A | 1/1986 | Adinolfi et al. | ............. 156/639 |
| 4,900,398 A | 2/1990 | Chen | .......................... 156/664 |
| 5,100,500 A | 3/1992 | Dastolfo et al. | ............ 156/637 |
| 5,102,499 A | 4/1992 | Jodgens et al. | ............. 156/664 |
| 5,126,005 A | 6/1992 | Blake | .......................... 156/630 |
| 5,215,624 A | 6/1993 | Dastolfo et al. | ............ 156/637 |
| 5,248,386 A | 9/1993 | Dastolfo et al. | ......... 156/659.1 |
| 5,281,062 A | 1/1994 | Dunkman et al. | .......... 409/179 |
| 5,655,883 A | 8/1997 | Schilling | ..................... 416/229 |
| 5,685,917 A | * 11/1997 | Sangeeta | ........................ 134/2 |
| 5,695,659 A | * 12/1997 | Dickie | .......................... 216/48 |
| 5,705,082 A | * 1/1998 | Hinson | ......................... 216/95 |
| 5,785,498 A | 7/1998 | Griggs | ......................... 156/94 |
| 5,944,909 A | 8/1999 | Reeves et al. | ................. 134/3 |
| 6,168,871 B1 | * 1/2001 | Ritter et al. | ................. 428/548 |
| 6,217,668 B1 | * 4/2001 | Czech et al. | ................... 134/3 |
| 6,413,051 B1 | 7/2002 | Chou et al. | ............. 416/229 A |

FOREIGN PATENT DOCUMENTS

EP    1162286    12/2002

OTHER PUBLICATIONS

John R. Walker, *Machining Fundamentals*, (2000), pp. 511–516.
Patent Abstracts of Japan, vol. 1999, No. 09, Jul. 30, 1999 (abstract of JP 11–10780 A to Toshiba published Apr. 20, 1999).

* cited by examiner

Primary Examiner—Robert Kunemund
Assistant Examiner—Shamim Ahmed
(74) Attorney, Agent, or Firm—VG Ramaswamy; Hasse Guttag & Nesbitt LLC; Eric W. Guttag

(57) ABSTRACT

A method for removing metal cladding adhered to an airfoil, such as a turbine blade, wherein the airfoil comprises a substrate and wherein at least a portion of the cladding is adhered to at least one surface of the substrate of the airfoil. In this method the cladding is treated with a chemical etchant of the metal that the cladding is made of for a period of time sufficient to remove at least the portion of the cladding adhered to the at least one surface of the substrate. The substrate is made of a material that is chemically resistant to the etchant.

23 Claims, 3 Drawing Sheets

METHOD FOR REMOVING METAL CLADDING FROM AIRFOIL SUBSTRATE

BACKGROUND OF THE INVENTION

The present invention relates generally to a method for removing metal cladding that is adhered to at least one surface of the substrate of an airfoil, such as a turbine (fan) blade, by treating the metal cladding with a chemical etchant. The present invention particularly relates to a method for removing titanium cladding that is adhered at or along the leading edge of the substrate of an airfoil, such as a turbine blade, to a non-metallic fiber reinforced resin substrate by treating the titanium cladding with a chemical etchant that comprises hydrofluoric acid.

High bypass turbofan engines are widely used for high performance aircraft that operate at subsonic speeds. Large fans are typically placed at the front of such engines, and serve to produce greater thrust and reduce specific fuel consumption. To minimize engine weight while optimizing performance, it is often preferred to incorporate a maximum number of fan blades having a fixed root blade configuration (i.e., the blade is dovetailed into a hub). Weight reduction can be achieved in high bypass engines with the use of composite fan blades formed from strong but lightweight materials such as aluminum and graphite fiber-reinforced epoxies. Use of these composite materials also allows for ease of manufacture of relatively complex contours in the blade.

Composite blades are susceptible to foreign object damage. Many types of foreign objects can be entrained in the inlet of an aircraft gas turbine engine ranging from large birds, such as seagulls, to hailstones, sand and rain. Smaller objects can erode the blade material and degrade the performance of the compressor. Impact by larger objects can rupture or pierce the blades with portions of an impacted blade being torn loose and causing extensive secondary damage to downstream blades and other engine components.

The vulnerability of these composite blades to foreign object damage is due to two factors. First, the lightweight matrix material employed for the substrate of the blade, such as polymeric resins or aluminum, can be susceptible to erosion. Second, when high strength filaments are used, these materials can be relatively brittle compared to metals and metal alloys, such as titanium. To provide the lightweight benefit of composites with the protection of metal, hybrid turbine fan blades have been made that comprise a composite substrate having an airfoil shape which is covered by a surface metal cladding, such as titanium cladding. Typically only the blade tip edge and the leading and trailing edge portions have such surface metal cladding which is usually bonded or adhered by a suitable adhesive to the composite substrate. Being less brittle, this metal cladding provides protection to the edges of the turbine fan blade, especially with regard to the leading edge of the blade, against foreign object damage and erosion.

Even this metal cladding adhered to the edges of the turbine fan blade can become dented and damaged due to foreign objects, and thus require repair or replacement. The prior method for removing such metal cladding from the leading, trailing and tip edges is by mechanical removal using a tool that can grasp the cladding. The cladding that is grasped by the tool is then pried or peeled away from the composite substrate to which it is adhered. Unfortunately, as the metal cladding is peeled away, it can strip off or otherwise damage the underlying composite substrate. This is particularly the case where the metal cladding is adhered to the composite substrate at or along an edge (e.g., leading edge) having a compound series of curves. In addition, metal claddings that are relatively strong and less malleable can tear (rather than bend) during this peeling operation, making it more difficult to remove the cladding. Tearing of the metal cladding is also more likely to occur when the cladding varies in thickness in the direction from the interior of the exposed blade surface (typically relatively thin) to the perimeter of the edge (typically relatively thick).

Accordingly, it would be desirable to be able to easily remove dented or damaged metal cladding adhered at or along the edge of a turbine fan blade or other airfoil without stripping away or otherwise damaging the underlying composite substrate, even when the edge has a compound series of curve and/or when the metal cladding is relatively strong and less malleable.

SUMMARY OF THE INVENTION

The present invention relates to a method for removing metal cladding adhered to an airfoil, such as a turbine blade, wherein the airfoil comprises a substrate and wherein at least a portion of the cladding is adhered to at least one surface of the substrate of the airfoil. This method comprises the step of treating the cladding with a chemical etchant of the metal that the cladding is made of for a period of time sufficient to remove at least the portion of the cladding adhered to the at least one surface of the substrate. The substrate is made of a material that is chemically resistant to the etchant.

The method of the present invention provides a number of significant benefits over prior mechanical methods for removing such metal cladding adhered to the substrate of an airfoil, especially turbine blade. The method of the present invention reduces or eliminates the damage that can be caused by prying or peeling away the cladding from the substrate using a mechanical tool. The method of the present invention is particularly advantageous where the metal cladding to be removed is relatively strong and less malleable. It is also advantageous where the metal cladding is adhered to the substrate at or along an edge (e.g., leading edge) having a compound series of curves and/or where the metal cladding varies in thickness from the interior of the exposed airfoil or blade surface (e.g., relatively thin) to the perimeter of the edge (e.g., relatively thick).

DETAILED DESCRIPTION OF THE INVENTION

Figure 1:
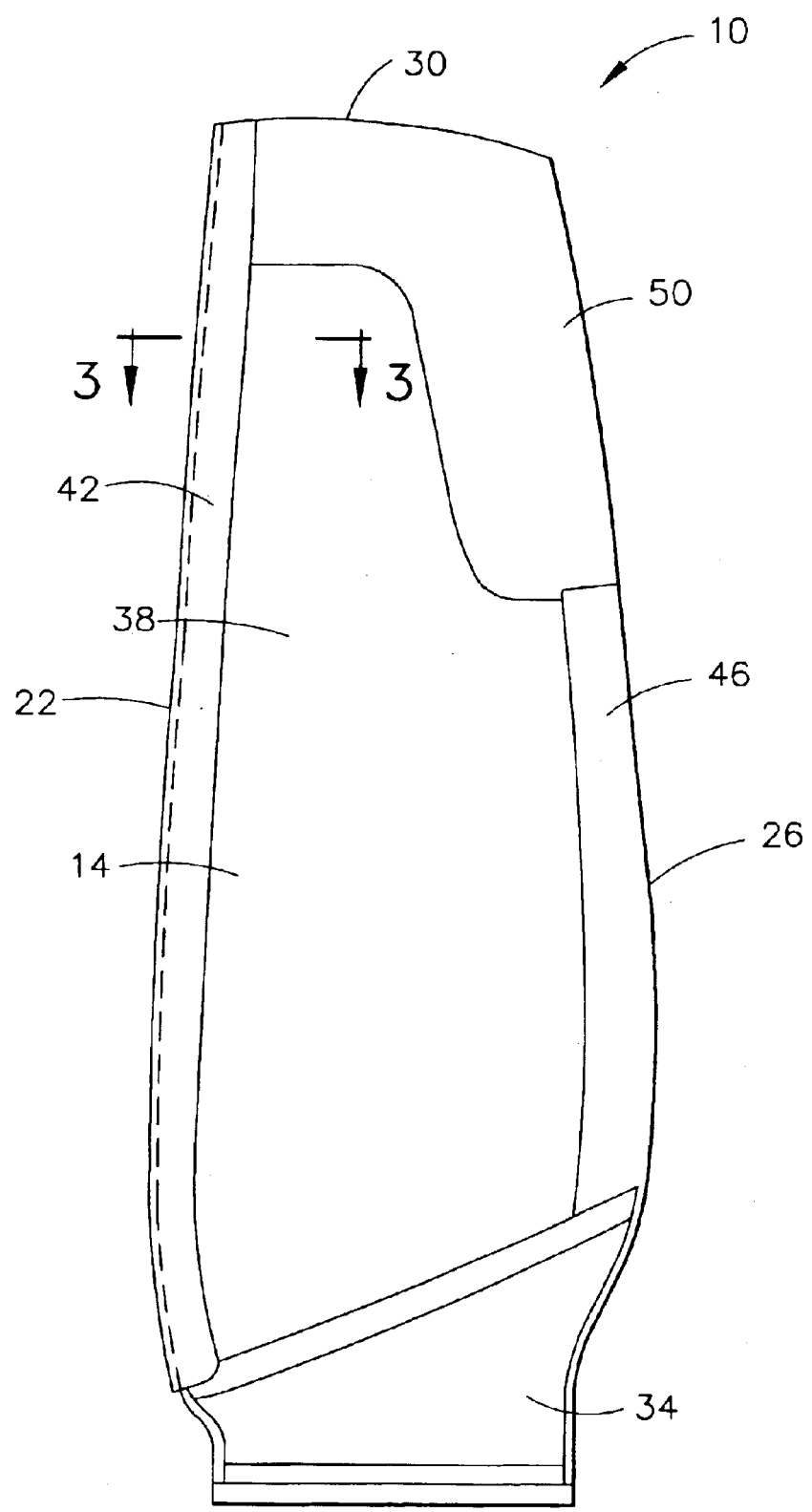
FIG. 1 shows the convex surface or "suction" side of a representative gas turbine engine fan blade for which the method of the present invention is useful.
Figure 2:
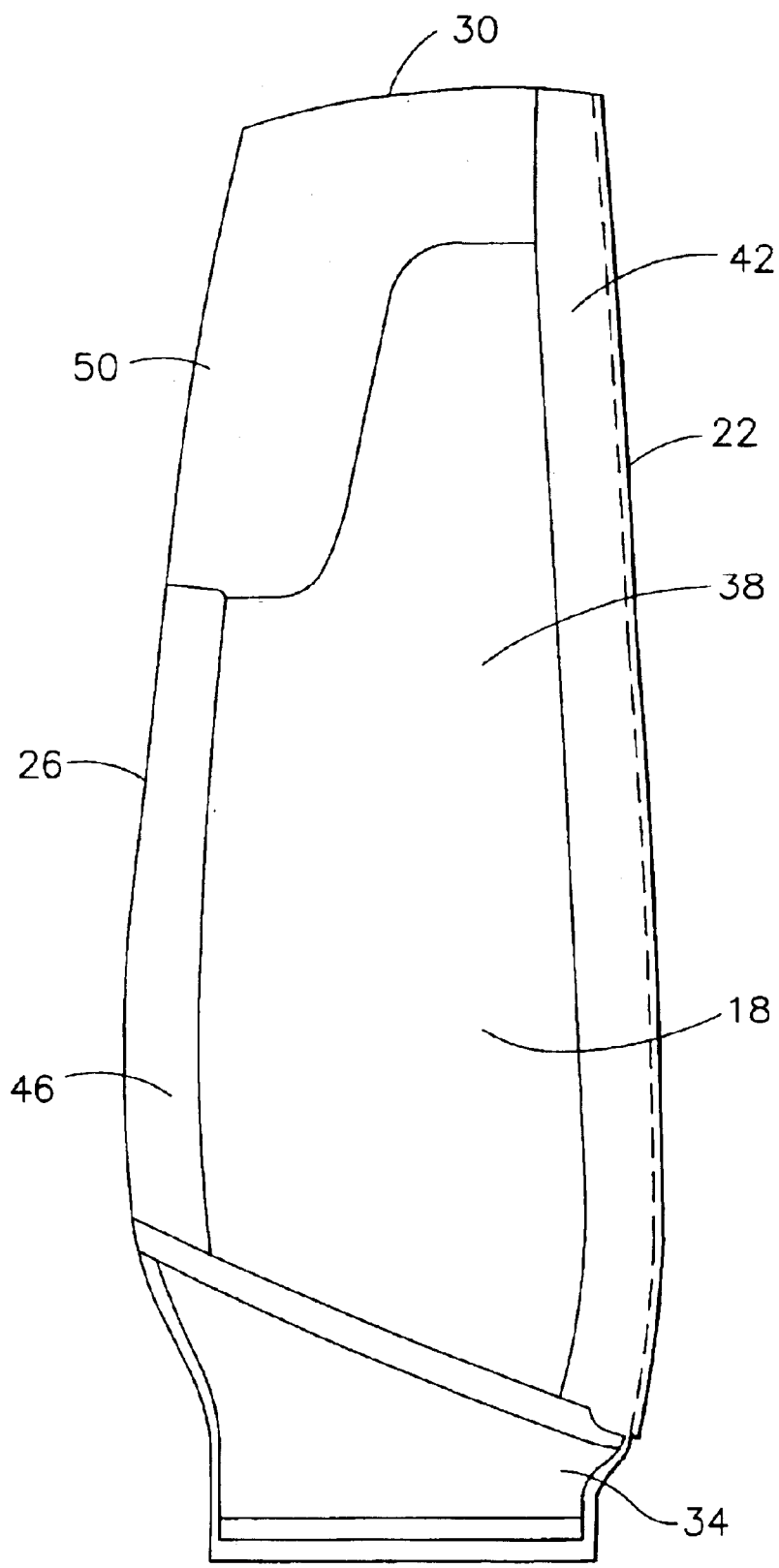
FIG. 2 shows the concave surface or "pressure" side of the blade of FIG. 1

Referring to the drawings, FIGS. 1 and 2 show different sides of a representative gas turbine engine fan blade for which the method of the present invention can be useful that is indicated generally as 10. While the description of the method of the present invention is with reference to a turbine fan blade, it should be understood that this method is applicable to other airfoils, including vanes, propellers, rotor blades (e.g., for helicopters), as well as other types of turbine blades that have metal cladding that is adhered to a substrate.

FIG. 1 shows the convex curved surface of blade 10 (also referred to as the "suction" side of the blade) indicated generally as 14, while FIG. 2 shows the concave curved surface of blade 10 (also referred to as the "pressure" side of the blade) indicated generally as 18. Blade 10 also has a leading edge indicated as 22, a trailing edge indicated as 26, a tip edge indicated as 30 and a blade root indicated as 34.

The substrate portion of blade 10 is indicated generally as 38. Substrate 38 can be made of either a metallic (e.g., aluminum) or nonmetallic materials (e.g., a resin-fiber matrix) that is typically relatively light in weight and relatively easy to form or mold into the desired configuration or shape of the blade. Typically substrate 38 is made of a composite material (i.e., two or more materials combined together), usually containing a reinforcement such as tapes, fibers or particles supported in a binder or matrix material (e.g., resin). Many composites can be used in substrate 38, including both metallic and non-metallic composites. Composites useful as substrates 38 are typically of the non-metallic type and can be made of a material containing a fiber such as a carbonaceous, silica, metal, metal oxide, or ceramic fiber embedded in a resin material such as Epoxy, PMR15, BMI, PEEK, etc. or a unidirectional tape material in an epoxy resin matrix. Fibers (or tape) can be impregnated with the resin, can be formed into suitable blade shape, and then cured via an autoclaving process or press molding to form a light weight, stiff, relatively homogeneous substrate 38.

As shown in FIGS. 1 and 2, metal cladding indicated generally as 42, 46 and 50 is adhered or attached to the substrate 38, typically using an appropriate adhesive (e.g., epoxy adhesive). Cladding 42 is shown as being positioned at or along the leading edge 22. Cladding 46 is shown as being positioned at or along a portion of the trailing edge 26 adjacent root 34. Cladding 50 is shown as being positioned at or along tip edge 30, as well as a portion of trailing edge 26 adjacent tip 30.

The metal cladding can comprise a variety of metals (or metal alloys), including titanium, steel, nickel, tungsten and alloys thereof. This metal cladding can be fabricated to precisely achieve desired airfoil contours for blade 10 or can be fabricated as formed sheet metal elements. The composition of the cladding can also vary depending on where it is positioned on blade 10. For example, cladding 42 that is positioned at or along leading edge 22 typically needs to be stronger and can made from a relatively strong metal or metal alloy such as Titanium 6-4 (an alloy of titanium with aluminum and vanadium). By contrast, cladding 46 positioned at or along trailing edge 26, as well as cladding 50 positioned at or along tip edge 30 need not be as strong and can be made from a less strong metal or metal alloy such as commercially pure titanium.

The method of the present invention comprises the step of treating one or more of the metal claddings 42, 46 and 50 of blade 10 with a chemical etchant for the metal that the cladding is made of. Chemical etchants have previously been used to remove material uniformly from the surfaces of unattached individual airfoils or blades, especially the thin oxidized layer or "alpha case" that can occur during forging of airfoils or blades made from titanium metal. See U.S. Pat. No. 4,563,239 (Adinolfi et al), issued Jan. 7, 1986, which discloses a method for chemical milling unattached individual airfoils or blades using a moving vessel such as a rotating barrel. However, chemical etchants have not been previously disclosed for use in removing metal claddings adhered to at least one surface of a substrate of a turbine blade.

The chemical etchants used in the method of the present invention will usually depend upon the metal (or metal alloy) that the cladding is made of, such as, for example titanium, steel, nickel, tungsten and alloys thereof. Typically, the chemical etchants used are aqueous etchant solutions comprising at least one strong acid such as hydrofluoric acid, nitric acid, hydrochloric acid, sulfuric acid, and mixtures thereof. For example, chemical etchants suitable for use with claddings made of titanium include aqueous solutions comprising hydrofluoric acid, or mixtures of hydrofluoric acid and nitric acid, such as, for example (by volume), from about 8 to about 16% concentrated nitric acid and from about 3 to about 10% concentrated hydrofluoric acid, including adding a commercial wetting agent as needed, such as Orvus WA (Procter & Gamble Co., Cincinnati, Ohio USA). See, for example, U.S. Pat. No. 4,563,239 (Adinolfi et al), issued Jan. 7, 1986 (especially col. 2, line 67 to col. 3, line 7), which is incorporated by reference. Chemical etchants suitable for use with claddings made of high tungsten content alloys include aqueous solutions comprising mixtures of hydrofluoric acid and nitric acid, such as, for example (by volume), from about 40 to about 60% concentrated nitric acid, from about 0.6 to about 0.8% concentrated hydrofluoric acid, and from about 30 to about 70% water, which also includes at least about 0.008 moles/l. of cupric sulfate and from about 0.0016 to about 0.025 moles/l. of ferric chloride. See, for example, U.S. Pat. No. 4,353,780 (Fishter et al), issued Oct. 12, 1982 (especially col. 1, lines 50-58), which is incorporated by reference. Chemical etchants suitable for use with claddings made of nickel based alloys include aqueous solutions comprising mixtures of nitric acid and hydrochloric acid, such as, for example (by volume), from about 40 to about 60% concentrated nitric acid, from about 5 to about 20% hydrochloric acid, the balance of the solution being water, including from about 0.008 to about 0.025 mole/l. of ferric chloride and at least about 0.016 mole/l. of cupric sulfate. See, for example, U.S. Pat. No. 4,411,730 (Fishter et al), issued Oct. 25, 1983 (especially col. 2, lines 40-51), which is incorporated by reference. Chemical etchants suitable for use with claddings made of IN-100 nickel based alloys include aqueous solutions comprising mixtures of hydrochloric acid and nitric acid such as, for example (by volume), from about 32.5 to about 85% hydrochloric acid (preferably from about 32.5 to about 42.5%), with other included ingredients proportioned relative to the volume of hydrochloric acid, namely, from about 35 to about 45 ml/l. of nitric acid, from about 0.0122 to about 0.0160 moles/l. of metal sulfate ion, from about 0.0283 to about 0.0369 moles/l. of metal chloride ion, from about 0.0146 to about 0.0190 moles/l. of metal fluoride ion and from about 0.0063 to about 0.0083 moles/l. of citric acid, with water being the balance of the solution. See, for example, U.S. Pat. No. 4,534,823 (Fishter et al), issued Aug. 13, 1985 (especially col. 2, lines 5–14), which is incorporated by reference.

The metal cladding(s) to be removed can be treated with the chemical in any suitable manner and for a period of time sufficient to remove the metal cladding from the surface of the substrate 38 that its adhered to, the substrate being relatively chemically resistant or inert to the chemical etchant. For example, the chemical etchant can be formulated as an aqueous solution with the metal cladding to be removed being brushed, sprayed, dipped or otherwise treated with this aqueous solution of etchant. Typically, the aqueous solution of etchant is sprayed, poured or flowed (e.g., by flowing the solution from a spray bar or bars) onto the metal cladding to be removed in a continuous manner until the cladding has been removed or dissolved away from the underlying surface of substrate 38. As the cladding is removed, the flow or application of the aqueous etchant solution is adjusted to minimize the exposure of substrate 38 to the etchant. The amount of time needed to treat the cladding for removal thereof will depend on a variety of factors, including the chemical etchant being used, the metal (or metal alloy) the cladding is made of, the thickness of the cladding and like factors. Typically, treatment of claddings made from titanium (or titanium alloy) with an aqueous hydrofluoric acid solution (e.g., having a concentration from about 2 to about 7% hydrofluoric acid) will remove or dissolve away the metal cladding at a rate of about 1 mil (0.025 mm) of thickness in from about 1 to about 1.5 minutes. In other words, a treatment period of from about 60 to about 120 minutes will typically be sufficient to remove or dissolve away claddings having thicknesses up to, for example, from about 60 to about 75 mils (from about 1.52 to about 1.91 mm).

Figure 3:
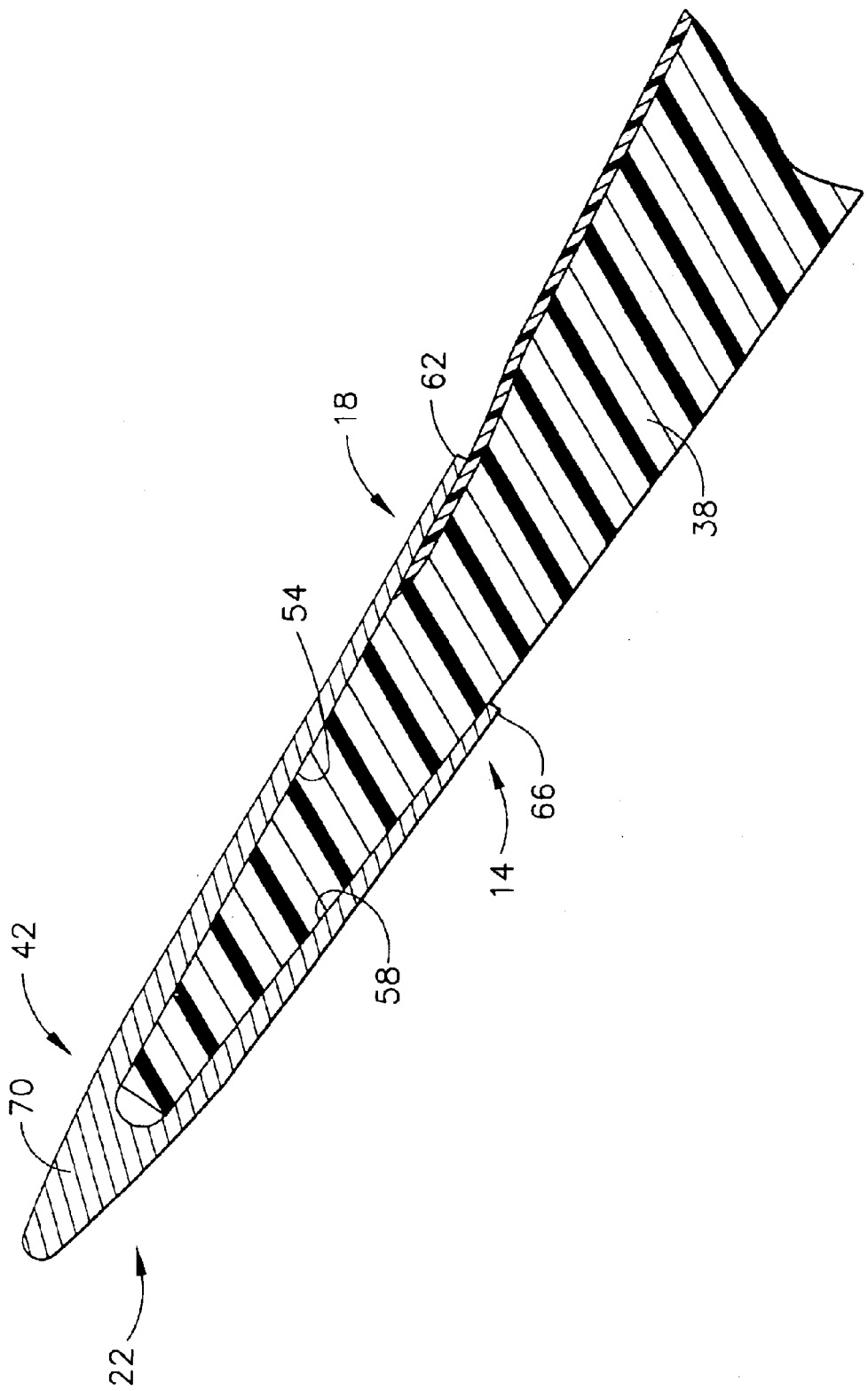
FIG. 3 is a partial sectional view taken along line 3-3 of FIG. 1.

The method of the present invention is particularly useful in removing metal claddings that are adhered to substrate 38 at or along an edge of blade 10. For example, as shown in FIG. 3, metal cladding 42 is adhered at or along leading edge 22 to surface 54 of the concave side 18 of substrate 38, as well as to surface 58 of the convex side 14 of substrate 38. As shown, FIG. 3 cladding 42 increases in thickness in the direction from the interior sections indicated as 62 and 66 which are relatively thin, e.g., from about 2 to about 10 mils (from about 0.051 to about 0.25 mm) thick, more typically from about 3 to about 8 mils (from about 0.076 to about 0.20 mm) thick), to the perimeter section 70 which is relatively thick, e.g., from about 60 to about 75 mils (from about 1.52 to about 1.91 mm) thick, more typically from about 65 to about 70 mils (from about 1.65 to about 1.78 mm) thick. To remove metal cladding 42 from edge 22, the cladding (or at least sections 62 and 66 of the cladding) can be treated with the chemical etchant until sections 62 and 66 of the cladding have been removed or dissolved away from surfaces 54 and 58 of substrate 38, at which point the perimeter section 70 of cladding 42 can be easily removed mechanically, e.g., broken, sawed or otherwise cut off from substrate 38. Typically, sections 62 and 66 of cladding 42 made from titanium metal (or metal alloy) will be removed or dissolved away by an aqueous hydrofluoric acid solution (e.g., having a concentration from about 2 to about 7% hydrofluoric acid) from surfaces 54 and 58 in from about 2 to about 15 minutes, more typically in from about 3 to about 12 minutes.

The method of the present invention can also be used to remove metal cladding 46 (from along trailing edge 26) or metal cladding 50 (from along tip edge 30 and trailing edge 26). The method of the present invention is also useful in removing metal cladding that is made of a metal or metal alloy (e.g., Titanium 6-4) that is relatively strong and less malleable and will typically tear during a peeling operation. This is often the case for cladding 42 that is positioned at or along leading edge 22. The method of the present invention is also particularly useful in removing metal cladding that is adhered to substrate 38 at or along an edge having a compound series of curves. Again, this is often the case for cladding 42 that is positioned at or along leading edge 22.

To protect other portions of blade 10 (especially metal claddings that do not require removal), maskants that are relatively chemically resistant or inert to the etchant can be applied to blade 10, and at least to the metal claddings of blade 10 that do not require removal and which can or may potentially come into contact with the chemical etchant during treatment. Suitable maskants include plastic films, coatings, or other materials that can be applied to the surface(s) that are made from polymers, compounds or other compositions that are chemically resistant or inert to the etchant such as ethylene glycol monomethyl ether-based compositions, rubber or synthetic rubber compositions such as neoprene-based polymers, and polytetrafluoroethylene. See, for example, U.S. Pat. No. 5,126,005 (Blake), issued Jun. 30, 1992 (especially col. 2, lines 8–34); U.S. Pat. No. 5,100,500 (Dastolfo), issued Mar. 31, 1992 (especially col. 5, lines 49–63); and U.S. Pat. No. 4,900,389 (Chen), issued Feb. 13, 1990 (especially col. 2, lines 46–51), all of which are incorporated by reference. The maskant can be applied in any conventional manner to the surface(s) (or portion of the surface(s)) of blade 10 to be protected from the etchant, including brushing, dipping, spraying, roller coating or flow coating. Once treatment with the chemical etchant has been carried out, the maskant can then be removed from blade 10.

After treatment of blade 10 with the chemical etchant, any residue thereof on the blade can be rinsed off (e.g., with water), neutralized or otherwise removed by methods known to those skilled in the art. Alternatively, treatment of blade 10 with the etchant can be halted periodically (e.g., every from about 3 to about 5 minutes), with the residual etchant on blade 10 being rinsed off and/or neutralized. Any maskant that is applied to the blade can also be removed, such as by stripping from the surfaces (with or without treatment with solvents for the maskant) or other methods known to those skilled in the art, so that blade 10 can be ready for replacing the removed metal cladding. Typically, there will be residual adhesive on substrate 38 that will need to be removed before the metal cladding can be replaced; this can be achieved by any suitable method known to those skilled in the art, including mechanical abrasive treatment (e.g., sanding).

While specific embodiments of the method of the present invention have been described, it will be apparent to those skilled in the art that various modifications thereto can be made without departing from the spirit and scope of the present invention as defined in the appended claims.

What is claimed is:

1. A method for removing metal cladding adhered to an airfoil wherein the airfoil comprises a substrate and wherein the cladding to be removed is positioned along one edge of the airfoil and is adhered to at least one surface of the substrate of the airfoil, the method comprising the step of selectively treating the cladding with a chemical etchant of the metal that the cladding is made of for a period of time sufficient to selectively remove at least a portion of the treated cladding only along the one edge of the airfoil from the at least one surface of the substrate, the substrate being made of a material that is chemically resistant to the etchant.

2. The method of claim 1 wherein the chemical etchant is an aqueous etchant solution comprising at least one strong acid.

3. The method of claim 2 wherein the strong acid is selected from the group consisting of hydrofluoric acid, nitric acid, hydrochloric acid, sulfuric acid, and mixtures thereof.

4. The method of claim 3 wherein the cladding is made of titanium or a titanium alloy, and wherein the strong acid is hydrofluoric acid.

5. The method of claim 2 wherein the treatment step comprises selectively flowing the aqueous etchant solution onto the cladding in a continuous manner until the treated cladding only along the one edge of the airfoil has been selectively removed from the at least one surface of the substrate.

6. The method of claim 1 wherein the cladding has at least one interior section and a perimeter section and wherein the cladding increases in thickness in the direction from the at least one interior section to the perimeter section.

7. The method of claim 6 wherein the at least one interior section has a thickness of from about 2 to about 10 mils (from about 0.051 to about 0.25 mm) and wherein the perimeter section has a thickness from about 60 to about 75 mils (from about 1.52 to about 1.91 mm).

8. The method of claim 7, wherein the at least one interior section is adhered to the at least one surface of the substrate and wherein the cladding is selectively treated with the chemical etchant until the at least one interior section is removed from the at least one surface.

9. The method of claim 7 wherein the at least one interior section of the cladding is treated with the chemical etchant for a period of from about 2 to about 15 minutes.

10. The method claim 8 wherein the airfoil has a convex side and a concave side and wherein the substrate comprises two surfaces, one surface of the substrate being on the convex side, the other surface of the substrate being on the concave side, and wherein the at least one interior section comprises two interior sections, one interior section being adhered to one surface of the substrate, the other interior section being adhered to the other surface of the substrate.

11. The method of claim 1 wherein the edge of the airfoil is the leading edge.

12. The method of claim 1 wherein the airfoil is a turbine fan blade.

13. A method for removing metal cladding adhered to a turbine fan blade, wherein the blade has convex side and a concave side and comprises a substrate having two surfaces, one surface of the substrate being on the convex side, the other surface of the substrate being on the concave side, and wherein the cladding is positioned along one edge of the blade, the cladding comprising two interior sections and a perimeter section, each interior section being adhered to one surface of the substrate, the method comprising the step of selectively treating the cladding positioned along the edge of the airfoil with a chemical etchant of the metal that the cladding is made of for a period of time sufficient to selectively remove only the interior sections adhered to the surfaces of the substrate, the substrate being made of a material that is chemically resistant to the etchant.

14. The method of claim 13 wherein the chemical etchant is an aqueous etchant solution comprising at least one strong acid.

15. The method of claim 14 wherein the strong acid is selected from the group consisting of hydrofluoric acid, nitric acid, hydrochloric acid, sulfuric acid, and mixtures thereof.

16. The method of claim 15 wherein the cladding is made of titanium or a titanium alloy, and wherein the strong acid is hydrofluoric acid.

17. The method of claim 16 wherein the treatment step comprises selectively flowing the aqueous etchant solution onto it least the interior sections of the cladding in a continuous manner until the only interior sections of the cladding have been removed from the surfaces of the substrate.

18. The method claim 17 wherein the cladding increases in thickness in the direction from the interior sections to the perimeter section.

19. The method of claim 18 wherein each interior section has a thickness of from about 3 to about 8 mils (from about 0.076 to about 0.20 mm) and wherein the perimeter section has a thickness from about 65 to about 70 mils (from about 1.65 to about 1.78 mm) and wherein the interior sections of the cladding are treated with the aqueous etchant solution for a period of from about 3 to about 12 minutes.

20. The method of claim 19 wherein the edge of the blade is the leading edge.

21. A method for removing metal cladding adhered to an airfoil wherein the airfoil comprises a substrate and wherein the cladding to be removed is positioned along one edge of the airfoil and is adhered to at least one surface of the substrate of the airfoil and wherein the substrate comprises a composite material selected from the group consisting of metallic composites and nonmetallic composites, the method comprising the step of selectively treating the cladding with a chemical etchant of the metal that the cladding is made of for a period of time sufficient to selectively remove at least a portion of the treated cladding only along the one edge of the airfoil from the at least one surface of the substrate, the substrate being made of a material that is chemically resistant to the etchant.

22. The method of claim 21 wherein the substrate is a nonmetallic composite.

23. The method of claim 22 wherein the substrate comprises a resin-fiber matrix.

* * * * *

UNITED STATES PATENT AND TRADEMARK OFFICE
CERTIFICATE OF CORRECTION

PATENT NO. : 6,843,928 B2
DATED : January 18, 2005
INVENTOR(S) : Cline et al.

Page 1 of 1

It is certified that error appears in the above-identified patent and that said Letters Patent is hereby corrected as shown below:

Column 8,
Line 10, "it" should be -- at --.

Signed and Sealed this

Twenty-seventh Day of September, 2005

JON W. DUDAS
*Director of the United States Patent and Trademark Office*